(12) United States Patent
Hwang

(10) Patent No.: US 11,993,317 B2
(45) Date of Patent: May 28, 2024

(54) VEHICLE CENTER PILLAR STRUCTURE

(71) Applicants: Hyundai Motor Company, Seoul (KR); Kia Corporation, Seoul (KR)

(72) Inventor: Chang Sup Hwang, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 111 days.

(21) Appl. No.: 17/847,489

(22) Filed: Jun. 23, 2022

(65) Prior Publication Data

US 2023/0159110 A1 May 25, 2023

(30) Foreign Application Priority Data

Nov. 19, 2021 (KR) .......................... 10-2021-0160554

(51) Int. Cl.
*B62D 27/02* (2006.01)
*B62D 25/02* (2006.01)
*B62D 25/04* (2006.01)

(52) U.S. Cl.
CPC ......... *B62D 27/023* (2013.01); *B62D 25/025* (2013.01); *B62D 25/04* (2013.01)

(58) Field of Classification Search
CPC .... B62D 25/025; B62D 25/04; B62D 27/023; B62D 21/157
USPC .................. 296/193.06, 209, 29, 30, 187.12
See application file for complete search history.

(56) References Cited

U.S. PATENT DOCUMENTS

| | | | |
|---|---|---|---|
| 8,662,575 B2 | 3/2014 | Tamura | |
| 8,979,177 B2 | 3/2015 | Kim et al. | |
| 10,322,752 B2 * | 6/2019 | Ayuzawa | B62D 25/025 |
| 11,242,092 B2 | 2/2022 | Yamazaki et al. | |
| 2013/0187406 A1 | 7/2013 | Torii | |
| 2014/0159427 A1 | 6/2014 | Kim et al. | |
| 2020/0398899 A1 | 12/2020 | Yamazaki et al. | |

FOREIGN PATENT DOCUMENTS

| | | |
|---|---|---|
| JP | H06263062 A | 9/1994 |
| JP | 2000085634 A | 3/2000 |
| JP | 3182902 B2 | 7/2001 |
| JP | 2007062409 A | 3/2007 |
| JP | 2009101727 A | 5/2009 |
| JP | 4718337 B2 | 7/2011 |
| JP | 5054467 B2 | 10/2012 |
| JP | 2020203599 A | 12/2020 |
| KR | 20140075482 A | 6/2014 |
| WO | 2012042596 A1 | 4/2012 |

* cited by examiner

*Primary Examiner* — Dennis H Pedder
(74) *Attorney, Agent, or Firm* — Slater Matsil, LLP

(57) ABSTRACT

An embodiment center pillar structure for a vehicle includes a center pillar including a lower connection portion, a side sill including an intermediate connection portion to which the lower connection portion of the center pillar is joined, a pillar reinforcement joined to an inboard surface of the center pillar, and a side sill reinforcement joined to an inboard surface of the side sill, wherein the pillar reinforcement and the side sill reinforcement are joined to the intermediate connection portion of the side sill.

20 Claims, 6 Drawing Sheets

VEHICLE CENTER PILLAR STRUCTURE

CROSS-REFERENCE TO RELATED APPLICATIONS

This application claims the benefit of Korean Patent Application No. 10-2021-0160554, filed on Nov. 19, 2021, which application is hereby incorporated herein by reference.

TECHNICAL FIELD

The present disclosure relates to a vehicle center pillar structure.

BACKGROUND

A side impact test introduced by the Insurance Institute for Highway Safety (IIHS) is designed to simulate an actual car in side crashes and reproduce real field accidents. In the IIHS side impact test, which is scheduled to be revised in 2022, the weight and strength of a moving deformable barrier (MDB) striking a vehicle body will be further increased. Accordingly, it is necessary to improve the overall stiffness and strength of the vehicle to sufficiently respond to the IIHS side impact test revisions.

A vehicle center pillar is designed to provide structural stiffness of the vehicle body and to improve crash performance and roof strength, thereby protecting a passenger compartment.

A lower portion of the center pillar may be joined to a side sill using fasteners, welding, and/or the like. During a side collision of the vehicle, an impact load may concentrate on a joint portion between the lower portion of the center pillar and the side sill, and the joint portion between the lower portion of the center pillar and the side sill may be excessively deformed (bent) by the impact load. Some overlapping portions between the lower portion of the center pillar and the side sill may be joined by spot welding. In order to increase stiffness and strength with respect to the joint portion between the lower portion of the center pillar and the side sill, a pillar reinforcement may be mounted in the lower portion of the center pillar, and a plurality of bulkheads may be mounted in a cavity of the side sill.

In the event of a side collision, however, the joint portion between the lower portion of the center pillar and the side sill may be easily deformed, and the lower portion of the center pillar may be easily pushed into the passenger compartment. Accordingly, a battery and the passenger compartment may not be safely protected during the side collision of the vehicle. In particular, the weight and strength of the MDB in the IIHS side impact test to be revised in 2022 will be increased, and thus it is necessary to improve stiffness and strength with respect to the joint portion between the lower portion of the center pillar and the side sill.

The above information described in this background section is provided to assist in understanding the background of the inventive concept, and may include any technical concept which is not considered as the prior art that is already known to those skilled in the art.

SUMMARY

The present disclosure relates to a vehicle center pillar structure. Particular embodiments relate to a vehicle center pillar structure significantly improving side crash performance (crashworthiness).

Embodiments of the present disclosure can solve problems occurring in the prior art while advantages achieved by the prior art are maintained intact.

An embodiment of the present disclosure provides a vehicle center pillar structure designed to increase stiffness and strength with respect to a joint portion between a lower portion of the center pillar and a side sill, thereby improving side crash performance (crashworthiness) of the vehicle.

According to an embodiment of the present disclosure, a vehicle center pillar structure may include a center pillar having a lower connection portion, a side sill having an intermediate connection portion to which the lower connection portion of the center pillar is joined, a pillar reinforcement joined to an inboard surface of the center pillar, and a side sill reinforcement joined to an inboard surface of the side sill. The pillar reinforcement and the side sill reinforcement may be joined to the intermediate connection portion of the side sill. Specifically, at least a portion of the intermediate connection portion of the side sill may be sandwiched between the pillar reinforcement and the side sill reinforcement.

The pillar reinforcement and the side sill reinforcement may be individually joined to the intermediate connection portion of the side sill, and the pillar reinforcement and the side sill reinforcement may be provided with at least a portion of the intermediate connection portion of the side sill sandwiched therebetween so that the pillar reinforcement and the side sill reinforcement may more firmly join the lower connection portion of the center pillar to the intermediate connection portion of the side sill. Thus, joint stiffness between the lower connection portion of the center pillar and the intermediate connection portion of the side sill may be significantly improved.

The pillar reinforcement may include a side wall joined to the lower connection portion of the center pillar, and a bottom flange joined to a top wall of the intermediate connection portion of the side sill.

The side wall of the pillar reinforcement may be joined to the lower connection portion of the center pillar, and the bottom flange of the pillar reinforcement may be joined to the top wall of the intermediate connection portion of the side sill so that the lower connection portion of the center pillar may be more firmly connected to the intermediate connection portion of the side sill through the pillar reinforcement. That is, the pillar reinforcement may increase connection stiffness between the lower connection portion of the center pillar and the intermediate connection portion of the side sill through the bottom flange.

The side sill reinforcement may be joined to the intermediate connection portion of the side sill. The intermediate connection portion may include an outboard side wall facing the exterior of the vehicle and the top wall facing the top of the vehicle.

Accordingly, the intermediate connection portion of the side sill may increase its own stiffness with the side sill reinforcement.

The side sill reinforcement may include a side wall joined to the outboard side wall of the intermediate connection portion and a top wall joined to the top wall of the intermediate connection portion.

At least a portion of the top wall of the intermediate connection portion may be sandwiched between the bottom flange of the pillar reinforcement and the top wall of the side sill reinforcement.

Thus, the bottom flange of the pillar reinforcement and the top wall of the side sill reinforcement may be firmly supported with respect to the top wall of the intermediate connection portion so that connection stiffness between the bottom flange of the pillar reinforcement and the top wall of the intermediate connection portion of the side sill may be improved.

The lower connection portion of the center pillar may include a lower outboard side wall joined to an outboard surface of the outboard side wall of the intermediate connection portion. The outboard side wall of the intermediate connection portion may be sandwiched between the lower outboard side wall of the lower connection portion and the side wall of the side sill reinforcement.

Thus, the lower connection portion of the center pillar and the side wall of the side sill reinforcement may be firmly supported with respect to the outboard side wall of the intermediate connection portion of the side sill so that connection stiffness between the lower connection portion of the center pillar and the intermediate connection portion of the side sill may be improved.

The vehicle center pillar structure may further include a plurality of bulkheads joined to the intermediate connection portion of the side sill and the side sill reinforcement.

Accordingly, the side sill reinforcement may connect the plurality of bulkheads in a longitudinal direction of the side sill, and the intermediate connection portion of the side sill may increase its own stiffness and strength with the plurality of bulkheads and the side sill reinforcement.

The lower connection portion may include a lower front wall facing the front of the vehicle and a lower rear wall facing the rear of the vehicle.

The pillar reinforcement may include a front wall joined to the lower front wall of the lower connection portion and a rear wall joined to the lower rear wall of the lower connection portion.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
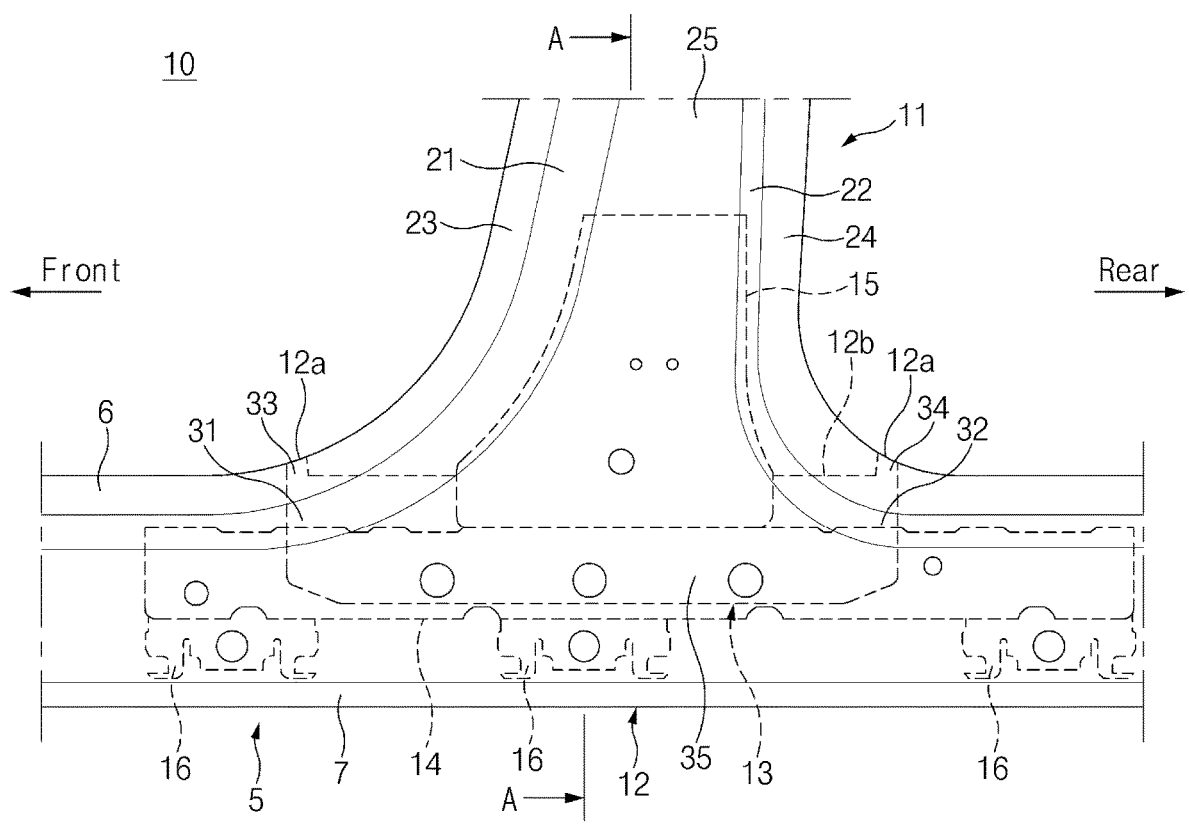
FIG. 1 illustrates a vehicle center pillar structure according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
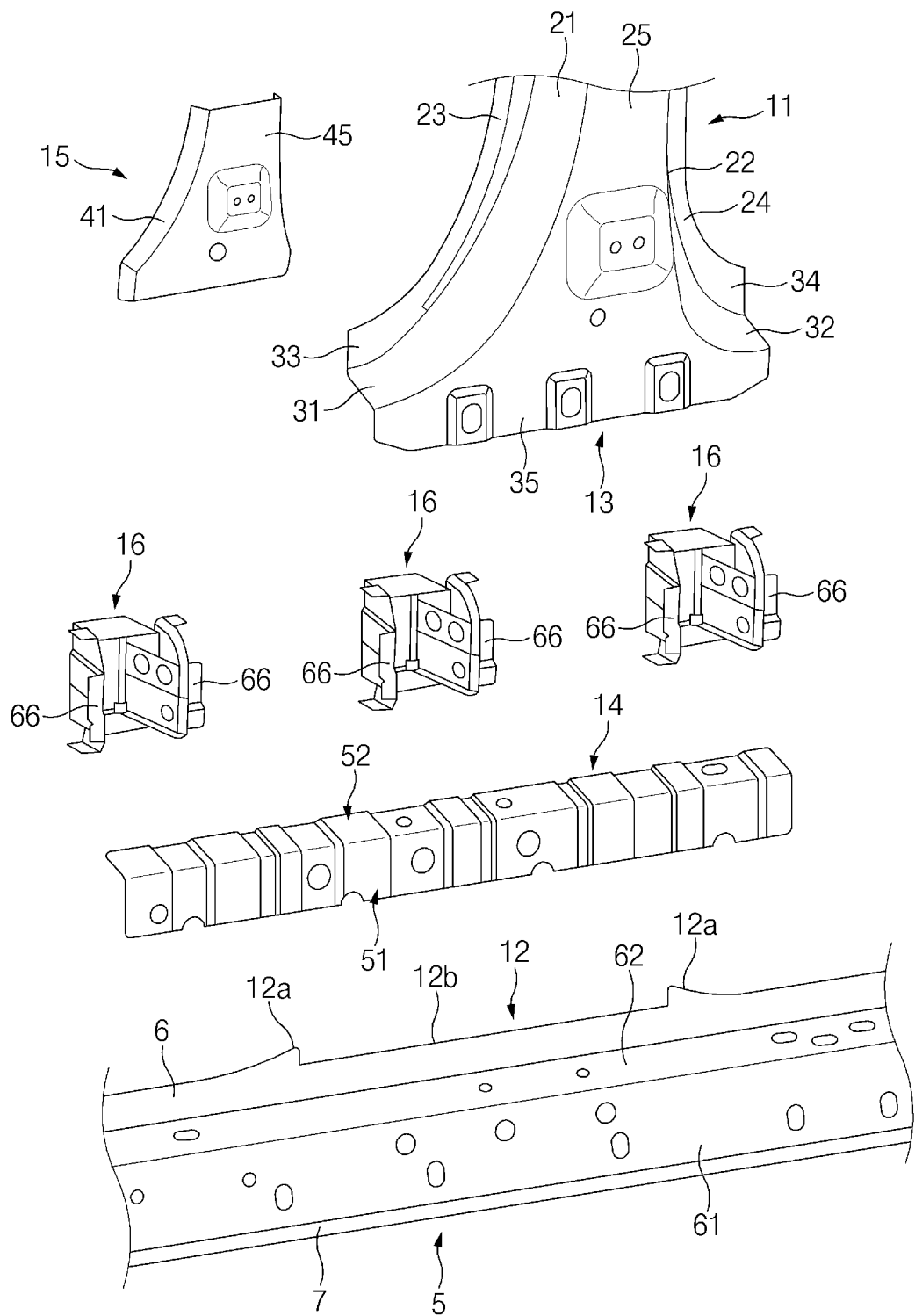
FIG. 2 illustrates an exploded perspective view of a vehicle center pillar structure according to an exemplary embodiment of the present disclosure.
Figure 3:
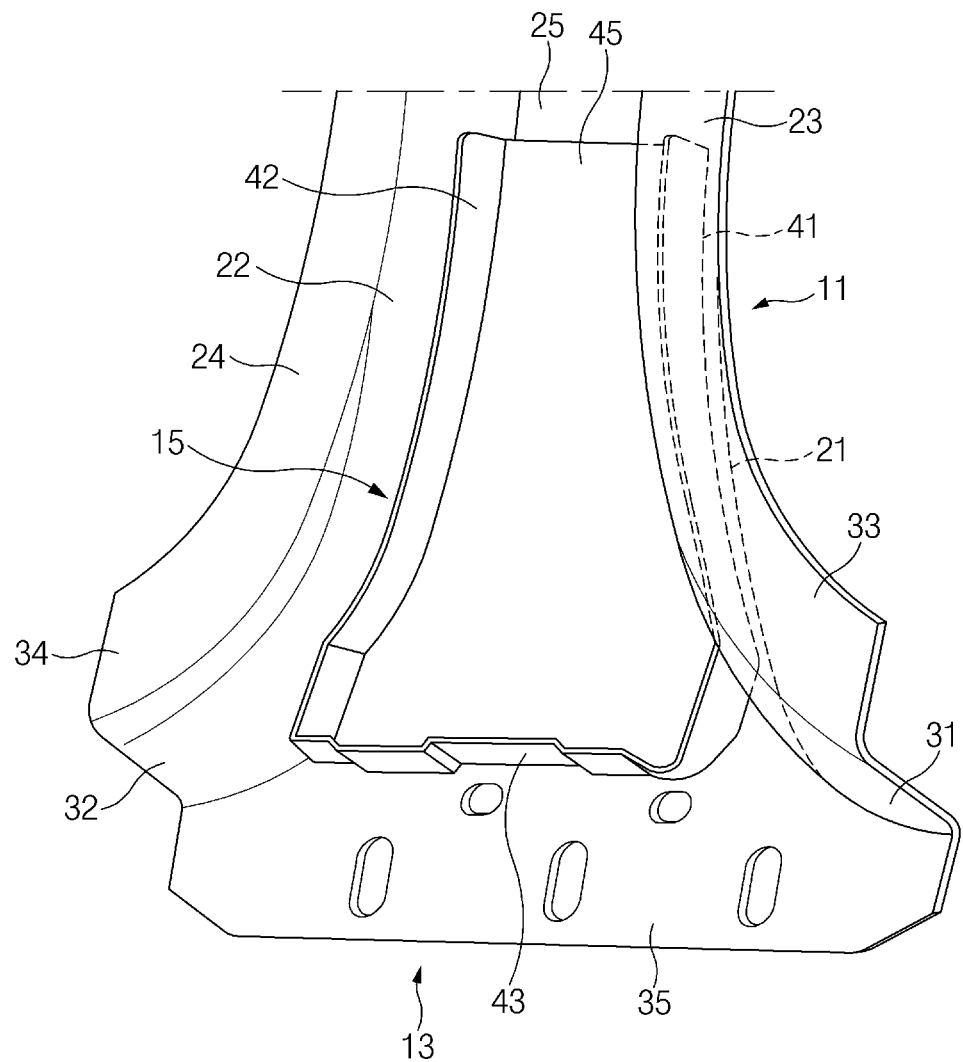
FIG. 3 illustrates a perspective view of a state in which a pillar reinforcement is mounted on a center pillar in a vehicle center pillar structure according to an exemplary embodiment of the present disclosure.

Referring to FIGS. 1 to 3, a vehicle center pillar structure 10 according to an exemplary embodiment of the present disclosure may include a center pillar 11 and a side sill 5 to which a lower portion of the center pillar 11 is joined.

The center pillar 11 may be a pillar which is located between a front seat and a rear seat. The center pillar 11 may extend vertically in the middle of a side opening of a vehicle body, and may be designed to respond to a side collision of the vehicle.

The center pillar 11 may include a center pillar outer facing the exterior of the vehicle, and a center pillar inner facing the interior of the vehicle. The center pillar 11 illustrated in FIGS. 1, 2, 3, 5, and 6 may be referred to as the center pillar outer, and the center pillar inner may be omitted.

The center pillar 11 may include a front wall 21 facing the front of the vehicle, a rear wall 22 facing the rear of the vehicle, and an outboard side wall 25 facing the exterior of the vehicle. The front wall 21 may be provided on a front edge of the outboard side wall 25, and the rear wall 22 may be provided on a rear edge of the outboard side wall 25. A front flange 23 may extend from the front wall 21 toward the front of the vehicle, and a rear flange 24 may extend from the rear wall 22 toward the rear of the vehicle.

The center pillar 11 may include a lower connection portion 13 provided on the lower portion thereof. The lower connection portion 13 may extend as one continuous piece from the center pillar 11 along a longitudinal direction of the center pillar 11. That is, the lower connection portion 13 and the center pillar 11 may form a unitary one piece along the longitudinal direction of the center pillar 11. Accordingly, an end face of the lower connection portion 13 may be continuous with respect to an end face of the center pillar 11 along the longitudinal direction of the center pillar 11. A width of the lower connection portion 13 may gradually increase from a top end thereof toward a bottom end thereof.

The width of the lower connection portion 13 may be greater than that of a main body of the center pillar 11, and the lower connection portion 13 may be directly joined to a middle portion of the side sill 5. In particular, the lower connection portion 13 may include a lower front wall 31 extending from the front wall 21 of the center pillar 11, a lower rear wall 32 extending from the rear wall 22 of the center pillar 11, and a lower outboard side wall 35 extending from the outboard side wall 25 of the center pillar 11. The lower front wall 31 may be provided on a front edge of the lower outboard side wall 35, and the lower rear wall 32 may be provided on a rear edge of the lower outboard side wall 35. A lower front flange 33 may extend from the lower front wall 31 toward the front of the vehicle, and a lower rear flange 34 may extend from the lower rear wall 32 toward the rear of the vehicle.

The pair of side sills 5 may be disposed on both side edges of the vehicle. Each side sill 5 may extend along a corresponding edge of the vehicle. The side sill 5 may include a side sill outer facing the exterior of the vehicle and a side sill inner facing the interior of the vehicle. The side sill 5 illustrated in FIGS. 1, 2, 4, 5, and 6 may be referred to as the side sill outer, and the side sill inner may be omitted.

Referring to FIGS. 1, 3, 5, and 6, a pillar reinforcement 15 may be joined to an inboard surface of the center pillar 11.

Referring to FIG. 3, the pillar reinforcement 15 may include a front wall 41 facing the front of the vehicle, a rear wall 42 facing the rear of the vehicle, and a side wall 45 located between the front wall 41 and the rear wall 42. The front wall 41 may be provided on the front of the side wall 45, and the rear wall 42 may be provided on the rear of the side wall 45.

The front wall 41 of the pillar reinforcement 15 may have a shape matching the front wall 21 of the center pillar 11 and the lower front wall 31 of the lower connection portion 13, and the front wall 41 of the pillar reinforcement 15 may be joined to the front wall 21 of the center pillar 11 and the lower front wall 31 of the lower connection portion 13 using fasteners, welding, and/or the like.

The rear wall 42 of the pillar reinforcement 15 may have a shape matching the rear wall 22 of the center pillar 11 and the lower rear wall 32 of the lower connection portion 13, and the rear wall 42 of the pillar reinforcement 15 may be joined to the rear wall 22 of the center pillar 11 and the lower rear wall 32 of the lower connection portion 13 using fasteners, welding, and/or the like.

Figure 6:
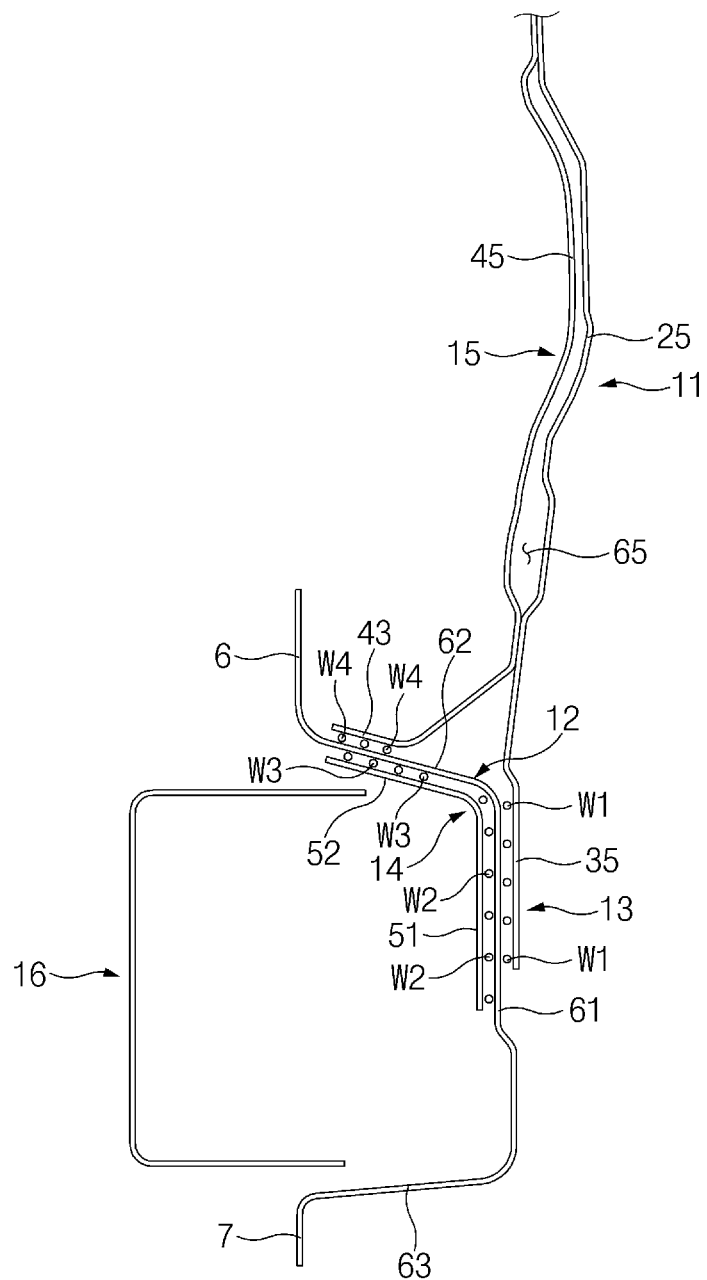
FIG. 6 illustrates a cross-sectional view, taken along line A-A of FIG. 1.

The side wall 45 of the pillar reinforcement 15 may have a shape matching the outboard side wall 25 of the center pillar 11 and the lower outboard side wall 35 of the lower connection portion 13, and the side wall 45 of the pillar reinforcement 15 may be joined to the outboard side wall 25 of the center pillar 11 and the lower outboard side wall 35 of the lower connection portion 13 using fasteners, welding, and/or the like. Referring to FIG. 6, a closed cavity 65 may be defined between the side wall 45 of the pillar reinforcement 15 and the outboard side wall 25 of the center pillar 11. Thus, stiffness of the center pillar 11 may be improved by the pillar reinforcement 15 and the closed cavity 65.

The pillar reinforcement 15 may include a bottom flange 43 provided on a bottom end of the side wall 45. The bottom flange 43 of the pillar reinforcement 15 may be joined to an intermediate connection portion 12 of the side sill 5 by spot welding and/or the like.

Referring to FIG. 1, the lower connection portion 13 of the center pillar 11 may be joined to the middle portion of the side sill 5 using fasteners, welding, and/or the like so that a joint portion may be formed between the lower connection portion 13 of the center pillar 11 and the middle portion of the side sill 5.

Figure 4:
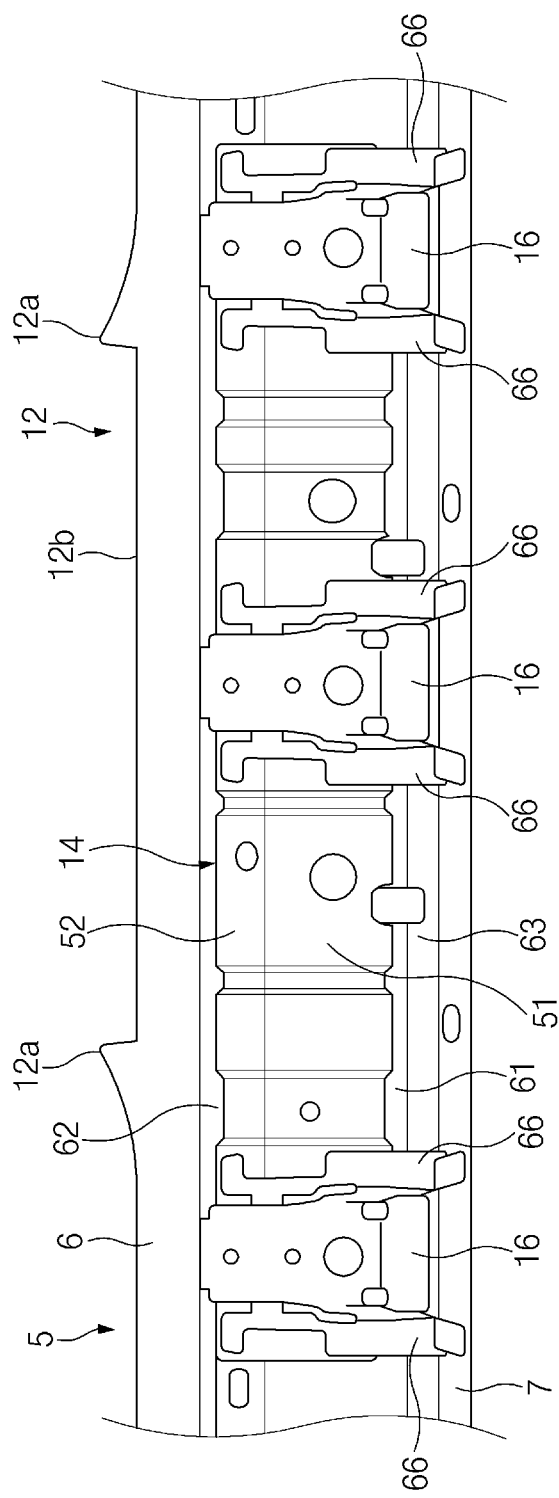
FIG. 4 illustrates a perspective view of a state in which a side sill reinforcement is mounted on an intermediate connection portion of a side sill in a vehicle center pillar structure according to an exemplary embodiment of the present disclosure.

The side sill 5 may include an outboard side wall facing the exterior of the vehicle, a top wall facing the top of the vehicle, and a bottom wall facing the bottom of the vehicle. Referring to FIGS. 1, 2, and 4, the side sill 5 may have a top flange 6 and a bottom flange 7. The side sill 5 may include the intermediate connection portion 12 provided in the middle portion thereof. The lower connection portion 13 of the center pillar 11 may be joined to the intermediate connection portion 12 of the side sill 5 using fasteners, welding, and/or the like.

The intermediate connection portion 12 may include an outboard side wall 61 facing the exterior of the vehicle, a top wall 62 facing the top of the vehicle, and a bottom wall 63 facing the bottom of the vehicle. The outboard side wall 61 of the intermediate connection portion 12 may be aligned with the outboard side wall of the side sill 5, the top wall 62 of the intermediate connection portion 12 may be aligned with the top wall of the side sill 5, and the bottom wall 63 of the intermediate connection portion 12 may be aligned with the bottom wall of the side sill 5.

The intermediate connection portion 12 may have a pair of projections 12a provided on the top thereof, and a recess 12b located between the pair of projections 12a. The pair of projections 12a may have a shape corresponding to the lower front flange 33 and the lower rear flange 34 of the lower connection portion 13 of the center pillar 11. According to an exemplary embodiment, the lower front flange 33 and the lower rear flange 34 of the lower connection portion 13 may be accurately joined to the intermediate connection portion 12 of the side sill 5 by spot welding and/or the like.

The bottom flange 43 of the pillar reinforcement 15 may be directly joined to the top wall 62 of the intermediate connection portion 12 of the side sill 5 using fasteners, welding, and/or the like. Accordingly, the front wall 41, the rear wall 42, and the side wall 45 of the pillar reinforcement 15 may be joined to the lower connection portion 13 of the center pillar 11, and the bottom flange 43 of the pillar reinforcement 15 may be joined to the top wall 62 of the intermediate connection portion 12 of the side sill 5 so that the lower connection portion 13 of the center pillar 11 may be more firmly connected to the intermediate connection portion 12 of the side sill 5 through the pillar reinforcement 15. That is, the pillar reinforcement 15 may increase connection stiffness between the lower connection portion 13 of the center pillar 11 and the intermediate connection portion 12 of the side sill 5 through the bottom flange 43.

Figure 5:
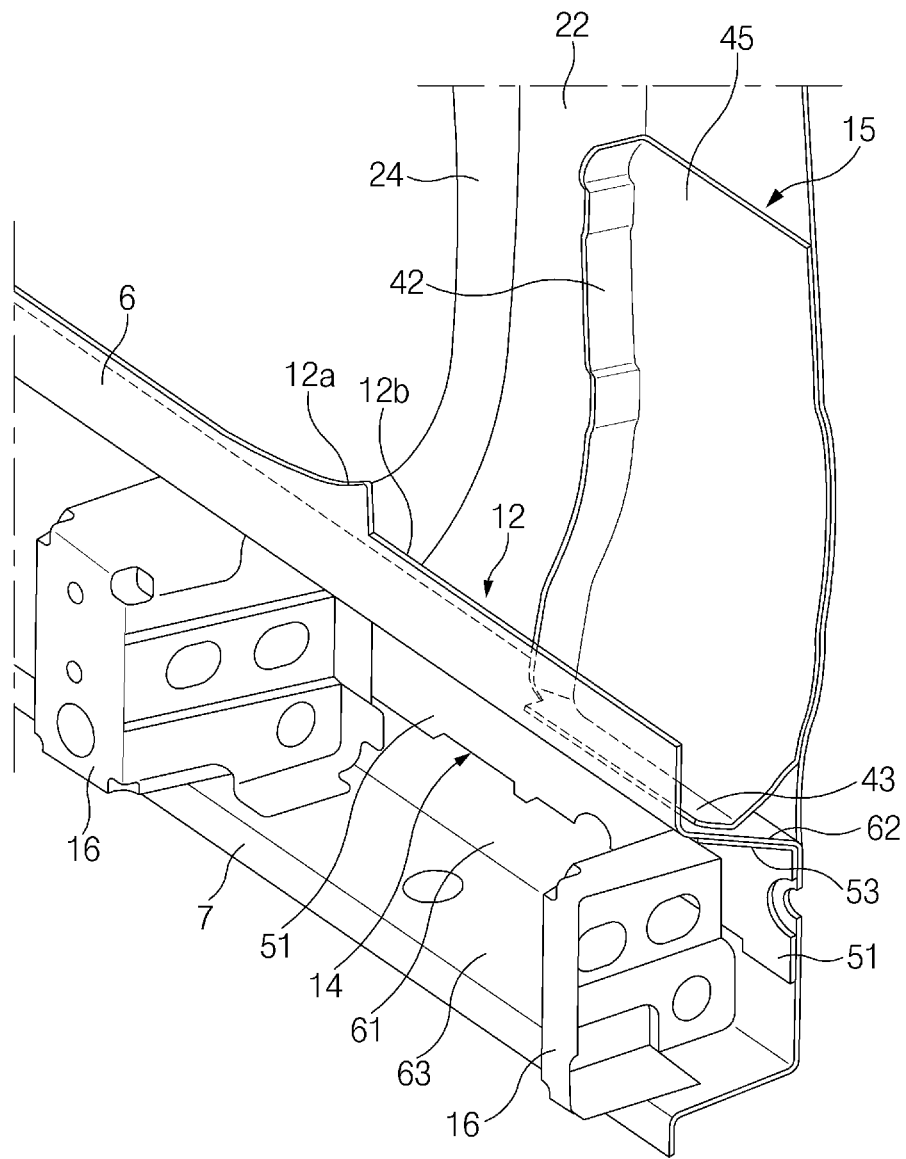
FIG. 5 illustrates a partially cut-away perspective view of a vehicle center pillar structure according to an exemplary embodiment of the present disclosure, which is viewed from the interior of the vehicle.

Referring to FIGS. 4 to 6, a side sill reinforcement 14 may be joined to an inboard surface of the intermediate connection portion 12 of the side sill 5. The intermediate connection portion 12 of the side sill 5 may increase its own stiffness with the side sill reinforcement 14.

Referring to FIGS. 2 and 4, the side sill reinforcement 14 may include a side wall 51 joined to the outboard side wall 61 of the intermediate connection portion 12, and a top wall 52 joined to the top wall 62 of the intermediate connection portion 12. Accordingly, the side sill reinforcement 14 may have an L-shaped cross section.

Referring to FIGS. 1 and 4 to 6, a plurality of bulkheads 16 may be joined to the inboard surface of the intermediate connection portion 12 of the side sill 5 and the side sill reinforcement 14. Referring to FIG. 2, each bulkhead 16 may have a pair of mounting flanges 66. Each mounting flange 66 may have a shape corresponding to the outboard side wall 61, the top wall 62, and the bottom wall 63 of the intermediate connection portion 12, and the mounting flanges 66 of each bulkhead 16 may be joined to the inboard surface of the intermediate connection portion 12 using fasteners, welding, and/or the like. In particular, at least a portion of the mounting flanges 66 of the bulkhead 16 may be joined to the side wall 51 and the top wall 52 of the side sill reinforcement 14 using fasteners, welding, and/or the like. Accordingly, the side sill reinforcement 14 may connect the plurality of bulkheads 16 in a longitudinal direction of the side sill 5, and the intermediate connection portion 12 of the side sill 5 may increase its own stiffness and strength with the plurality of bulkheads 16 and the side sill reinforcement 14.

Referring to FIG. 6, the lower outboard side wall 35 of the lower connection portion 13 of the center pillar 11 may be joined to an outboard surface of the outboard side wall 61 of the intermediate connection portion 12 of the side sill 5 by a plurality of spot welds W1. Since a joint area between the lower outboard side wall 35 of the lower connection portion 13 and the outboard side wall 61 of the intermediate connection portion 12 is relatively large, the lower connection portion 13 of the center pillar 11 may be firmly joined to the intermediate connection portion 12 of the side sill 5. The side wall 51 of the side sill reinforcement 14 may be joined to an inboard surface of the outboard side wall 61 of the intermediate connection portion 12 of the side sill 5 by a plurality of spot welds W2. Accordingly, the lower outboard side wall 35 of the lower connection portion 13 and the side wall 51 of the side sill reinforcement 14 may partially overlap each other with the outboard side wall 61 of the intermediate connection portion 12 interposed therebetween so that the outboard side wall 61 of the intermediate connection portion 12 may be sandwiched between the lower outboard side wall 35 of the lower connection portion 13 and the side wall 51 of the side sill reinforcement 14. Thus, the lower connection portion 13 of the center pillar 11 and the side wall 51 of the side sill reinforcement 14 may be firmly supported with respect to the outboard side wall 61 of the intermediate connection portion 12 of the side sill 5 so that the connection stiffness between the lower connection portion 13 of the center pillar 11 and the intermediate connection portion 12 of the side sill 5 may be improved.

Referring to FIG. 6, the top wall 52 of the side sill reinforcement 14 may be joined to an inboard surface of the top wall 62 of the intermediate connection portion 12 of the side sill 5 by a plurality of spot welds W3. The bottom flange 43 of the pillar reinforcement 15 may be joined to an outboard surface of the top wall 62 of the intermediate connection portion 12 of the side sill 5 by a plurality of spot welds W4. Accordingly, the bottom flange 43 of the pillar reinforcement 15 and the top wall 52 of the side sill reinforcement 14 may overlap (face) each other with the top wall 62 of the intermediate connection portion 12 interposed therebetween so that a portion of the top wall 62 of the intermediate connection portion 12 may be sandwiched between the bottom flange 43 of the pillar reinforcement 15 and the top wall 52 of the side sill reinforcement 14. Thus, the bottom flange 43 of the pillar reinforcement 15 and the top wall 52 of the side sill reinforcement 14 may be firmly supported with respect to the top wall 62 of the intermediate connection portion 12 so that the connection stiffness between the bottom flange 43 of the pillar reinforcement 15 and the top wall 62 of the intermediate connection portion 12 of the side sill 5 may be improved.

Referring to FIG. 6, in a joint portion between the lower connection portion 13 of the center pillar 11 and the intermediate connection portion 12 of the side sill 5, the bottom flange 43 of the pillar reinforcement 15 may be joined to the outboard surface of the top wall 62 of the intermediate connection portion 12 of the side sill 5, and the top wall 52 of the side sill reinforcement 14 may be joined to the inboard surface of the top wall 62 of the intermediate connection portion 12 of the side sill 5 so that the lower connection portion 13 of the center pillar 11 and the intermediate connection portion 12 of the side sill 5 may be connected to form a T-shaped structure. Thus, joint stiffness between the lower connection portion 13 of the center pillar 11 and the intermediate connection portion 12 of the side sill 5 may be improved.

As set forth above, according to exemplary embodiments of the present disclosure, by increasing stiffness and strength with respect to the joint portion between the lower portion of the center pillar and the side sill, side crash performance (crashworthiness) of the vehicle may be improved. Specifically, in the joint portion between the lower connection portion of the center pillar and the intermediate connection portion of the side sill, the bottom flange of the pillar reinforcement and the outboard surface of the top wall of the intermediate connection portion of the side sill may be joined, and the top wall of the side sill reinforcement and the inboard surface of the top wall of the intermediate connection portion of the side sill may be joined so that the lower connection portion of the center pillar and the intermediate connection portion of the side sill may be joined to form a T-shaped structure, thereby improving the joint stiffness between the lower connection portion of the center pillar and the intermediate connection portion of the side sill.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A center pillar structure for a vehicle, the center pillar structure comprising:
    a center pillar comprising a lower connection portion;
    a side sill comprising an intermediate connection portion to which the lower connection portion of the center pillar is joined;
    a pillar reinforcement joined to an inboard surface of the center pillar; and
    a side sill reinforcement joined to an inboard surface of the side sill, wherein the pillar reinforcement and the side sill reinforcement are joined to the intermediate connection portion of the side sill;
    wherein the pillar reinforcement comprises a bottom flange joined to a top wall of the intermediate connection portion of the side sill;
    wherein the side sill reinforcement comprises a top wall joined to the top wall of the intermediate connection portion; and
    wherein at least a portion of the top wall of the intermediate connection portion is sandwiched between the bottom flange of the pillar reinforcement and the top wall of the side sill reinforcement.

2. The center pillar structure according to claim 1, wherein the pillar reinforcement further comprises a side wall joined to the lower connection portion of the center pillar.

3. The center pillar structure according to claim 2, wherein the intermediate connection portion comprises an outboard side wall facing an exterior of the vehicle and the top wall facing a top of the vehicle.

4. The center pillar structure according to claim 3, wherein the side sill reinforcement comprises a side wall joined to the outboard side wall of the intermediate connection portion.

5. The center pillar structure according to claim 4, wherein:

the lower connection portion comprises a lower outboard side wall joined to an outboard surface of the outboard side wall of the intermediate connection portion; and the outboard side wall of the intermediate connection portion is sandwiched between the lower outboard side wall of the lower connection portion and the side wall of the side sill reinforcement.

6. The center pillar structure according to claim 1, further comprising a plurality of bulkheads joined to the intermediate connection portion of the side sill and the side sill reinforcement.

7. The center pillar structure according to claim 1, wherein the lower connection portion comprises a lower front wall facing a front of the vehicle and a lower rear wall facing a rear of the vehicle.

8. The center pillar structure according to claim 7, wherein the pillar reinforcement comprises:
a front wall joined to the lower front wall of the lower connection portion; and
a rear wall joined to the lower rear wall of the lower connection portion.

9. A vehicle comprising:
a vehicle body comprising a side opening;
a center pillar extending vertically in a middle of the side opening, the center pillar comprising a lower connection portion;
a side sill comprising an intermediate connection portion to which the lower connection portion of the center pillar is joined;
a pillar reinforcement joined to an inboard surface of the center pillar; and
a side sill reinforcement joined to an inboard surface of the side sill, wherein the pillar reinforcement and the side sill reinforcement are joined to the intermediate connection portion of the side sill;
wherein the pillar reinforcement comprises a bottom flange joined to a top wall of the intermediate connection portion of the side sill;
wherein the side sill reinforcement comprises a top wall joined to the top wall of the intermediate connection portion; and
wherein at least a portion of the top wall of the intermediate connection portion is sandwiched between the bottom flange of the pillar reinforcement and the top wall of the side sill reinforcement.

10. The vehicle according to claim 9, wherein the pillar reinforcement further comprises a side wall joined to the lower connection portion of the center pillar.

11. The vehicle according to claim 10, wherein the intermediate connection portion comprises an outboard side wall facing an exterior of the vehicle and the top wall facing a top of the vehicle.

12. The vehicle according to claim 11, wherein the side sill reinforcement further comprises a side wall joined to the outboard side wall of the intermediate connection portion.

13. The vehicle according to claim 12, wherein:
the lower connection portion comprises a lower outboard side wall joined to an outboard surface of the outboard side wall of the intermediate connection portion; and
the outboard side wall of the intermediate connection portion is sandwiched between the lower outboard side wall of the lower connection portion and the side wall of the side sill reinforcement.

14. The vehicle according to claim 9, further comprising a plurality of bulkheads joined to the intermediate connection portion of the side sill and the side sill reinforcement.

15. The vehicle according to claim 9, wherein the lower connection portion comprises a lower front wall facing a front of the vehicle and a lower rear wall facing a rear of the vehicle.

16. The vehicle according to claim 15, wherein the pillar reinforcement comprises:
a front wall joined to the lower front wall of the lower connection portion; and
a rear wall joined to the lower rear wall of the lower connection portion.

17. A method of providing a center pillar structure for a vehicle, the method comprising:
providing a center pillar comprising a lower connection portion;
providing a side sill comprising an intermediate connection portion to which the lower connection portion of the center pillar is joined;
providing a pillar reinforcement joined to an inboard surface of the center pillar; and
providing a side sill reinforcement joined to an inboard surface of the side sill, wherein the pillar reinforcement and the side sill reinforcement are joined to the intermediate connection portion of the side sill;
wherein the pillar reinforcement comprises a bottom flange joined to a top wall of the intermediate connection portion of the side sill;
wherein the side sill reinforcement comprises a top wall joined to the top wall of the intermediate connection portion; and
wherein at least a portion of the top wall of the intermediate connection portion is sandwiched between the bottom flange of the pillar reinforcement and the top wall of the side sill reinforcement.

18. The method according to claim 17, wherein the pillar reinforcement further comprises a side wall joined to the lower connection portion of the center pillar.

19. The method according to claim 18, wherein the intermediate connection portion comprises an outboard side wall facing an exterior of the vehicle and the top wall facing a top of the vehicle.

20. The method according to claim 19, wherein the side sill reinforcement comprises a side wall joined to the outboard side wall of the intermediate connection portion.

* * * * *